United States Patent
Kurauchi

(10) Patent No.: US 8,265,274 B2
(45) Date of Patent: Sep. 11, 2012

(54) DATA PROCESSING DEVICE, DATA PROCESSING METHOD, DATA PROCESSING PROGRAM, RECORDING MEDIUM CONTAINING THE DATA PROCESSING PROGRAM AND INTEGRATED CIRCUIT

(75) Inventor: Nobukazu Kurauchi, Aichi (JP)

(73) Assignee: Panasonic Corporation, Osaka (JP)

( * ) Notice: Subject to any disclaimer, the term of this patent is extended or adjusted under 35 U.S.C. 154(b) by 435 days.

(21) Appl. No.: 12/297,950

(22) PCT Filed: Apr. 23, 2007

(86) PCT No.: PCT/JP2007/058708
§ 371 (c)(1),
(2), (4) Date: Oct. 21, 2008

(87) PCT Pub. No.: WO2007/125848
PCT Pub. Date: Nov. 8, 2007

(65) Prior Publication Data
US 2009/0132776 A1 May 21, 2009

(30) Foreign Application Priority Data
Apr. 24, 2006 (JP) .................. 2006-118917

(51) Int. Cl.
*H04N 7/167* (2011.01)
(52) U.S. Cl. ......... 380/201; 713/200; 375/200; 370/431
(58) Field of Classification Search .................. 380/201
See application file for complete search history.

(56) References Cited

U.S. PATENT DOCUMENTS

| | | | |
|---|---|---|---|
| 5,822,676 A | 10/1998 | Hayashi et al. | |
| 5,970,142 A | 10/1999 | Erickson | |
| 6,057,832 A | 5/2000 | Lev et al. | |
| 6,079,566 A * | 6/2000 | Eleftheriadis et al. ................. 1/1 |
| 2002/0047899 A1* | 4/2002 | Son et al. ....................... 348/114 |
| 2003/0081776 A1 | 5/2003 | Candelore | |
| 2003/0226029 A1* | 12/2003 | Porter et al. ................... 713/200 |
| 2004/0008770 A1* | 1/2004 | Okada et al. ............. 375/240.02 |

(Continued)

FOREIGN PATENT DOCUMENTS

CN 1280741 1/2001
(Continued)

OTHER PUBLICATIONS

Supplementary European Search Report for Application No. EP 07 74 2143, Sep. 22, 2009, Panasonic Corporation.

(Continued)

*Primary Examiner* — Carl Colin
*Assistant Examiner* — S. Ali Zaidi

(57) ABSTRACT

A data processing device for processing stream data composed of a plurality of frames generated with encoded contents data, which includes a protected storage unit for storing data, being protected from external access, a non-protected storage unit for storing data, a receiving unit for receiving stream data, a separating unit for separating the stream data into protected data including frames necessary for decoding of other frames, and non-protected data not including frames necessary for decoding of other frames, and storing the protected data in the protected storage unit and storing the non-protected data in the non-protected storage unit, and a combining unit for restoring the stream data by combining the protected data stored in the protected storage unit and the non-protected data stored in the non-protected storage unit.

20 Claims, 7 Drawing Sheets

U.S. PATENT DOCUMENTS

| | | | |
|---|---|---|---|
| 2004/0091114 A1 | 5/2004 | Carter et al. | |
| 2004/0160974 A1* | 8/2004 | Read et al. | 370/431 |
| 2005/0097614 A1* | 5/2005 | Pedlow et al. | 725/90 |

FOREIGN PATENT DOCUMENTS

| | | |
|---|---|---|
| EP | 1 182 554 A2 | 2/2002 |
| EP | 1 187 483 A2 | 3/2002 |
| EP | 1 370 084 A1 | 12/2003 |
| JP | 2001-043139 A | 2/2001 |
| JP | 2001-069481 A | 3/2001 |
| JP | 2002-014871 A | 1/2002 |
| JP | 2003-280989 A | 10/2003 |
| JP | 2004-199693 A | 7/2004 |
| JP | 2006-023957 A | 1/2006 |
| JP | 2006-121347 A | 5/2006 |
| WO | WO 98/21852 | 5/1998 |
| WO | WO 2005/096168 A1 | 10/2005 |

OTHER PUBLICATIONS

International Search Report for International Application No. PCT/JP2007/058708, Jul. 31, 2007, Panasonic Corporation.

* cited by examiner

US 8,265,274 B2

DATA PROCESSING DEVICE, DATA PROCESSING METHOD, DATA PROCESSING PROGRAM, RECORDING MEDIUM CONTAINING THE DATA PROCESSING PROGRAM AND INTEGRATED CIRCUIT

This application is a U.S. National Phase Application of PCT International Application PCT/JP2007/058708.

TECHNICAL FIELD

The present invention relates to a data processing device and a data processing method for processing stream data composed of a plurality of packets of encoded and packetized contents data.

BACKGROUND ART

Recently, owing to the advancement of technologies related to the multimedia, new technologies are rapidly spreading about the device and method of compressing and encoding audio data and video data, and processing of digital data produced by compressing and encoding. In particular, the capacity is rapidly becoming larger in recording media such as hard disk, optical disk, and memory card as recording media used in information appliances. Along with the trend of larger capacity of such recording media, in the field of consumer video appliance field, it is generally required to record video and audio signals for a long time such as movie programs in digital system. Further, by utilizing such digital recording technology of recording in digital system, as compared with recording by conventional analog system, movie programs can be recorded while maintaining high image quality and high sound quality.

On the other hand, by utilizing such digital recording technology, moving images and sound signals can be easily copied without deteriorating the picture quality or sound quality. Hence, copyrighted contents can be easily duplicated, and it was a conventional problem to prevent illegal copies. To solve such problem, hitherto, a technology has been proposed about copyright protection for the purpose of preventing illegal copies. One of the technologies about copyright protection is a technology of encrypting the information and encrypting the recording and communications in order to conceal the information in recording and communications. Accordingly, in recording media such as DVD as a kind of optical disk, or SD memory card as a kind of memory card, it has been proposed to record while the stream data including digital moving images and contents data are being encrypted. By such technology, the contents are concealed, and the copyright of the contents is protected.

A recording and reproducing apparatus for recording stream data including video data and others in such recording media, or reproducing the stream data recorded in the recording media is provided with LSI and other integrated circuits as the data processing units for compressing, expanding or encrypting the contents data. Further, for such data processing, usually, the outside of the LSI is provided with an external memory for temporarily storing the data being processed.

In such structure in which the LSI and external memory are connected and the data is processed, the image data to be encrypted and decrypted by, for example, the LSI, and the data in the process of decryption are transferred between the LSI and the external memory. Accordingly, it was possible to read, illegally, the data to be transferred to the external memory. On the other hand, by processing the data by making use of only the internal memory provided in the LSI, such illegal action can be prevented, but there was a limit for processing the large capacity of data such as image data by the internal memory alone. Hence, conventionally, it has been proposed to prevent illegal data reading while processing the data by using the external memory.

FIG. 7 is a block diagram of a conventional data processing device intended to protect the data. As shown in FIG. 7, the conventional data processing device reads the stream data recorded in a recording medium outside of the device such as DVD or memory card from recording medium interface unit (or called recording medium I/F unit) 910. Further, in the conventional data processing device, while the data being processed is stored temporarily in external memory 920, LSI 900 executes the data processing. In an example of the data processing device shown in FIG. 7, recording medium I/F unit 910 reads in the scrambled data recorded in the recording medium. The scrambled data is the image data being compressed and encoded into stream data by MPEG (Moving Picture Expert Group) system, and further processed by scrambling. LSI 900 executes a reproduction process of restoring the contents data of video and audio from such scrambled data.

When the scrambled data is supplied into LSI 900, descrambling unit 91 descrambles the scrambled data. As a result, descrambling unit 91 generates stream data based on the MPEG system, and transfers the stream data to internal memory 94 by internal CPU 90. The stream data transferred in internal memory 94 is transferred to external memory 920 by memory control unit 95, and is temporarily stored in external memory 920.

In such transfer of stream data into external memory 920, memory control unit 95 sets address data showing the transfer destination region of external memory 920, and supplied into external memory 920. Data type detection unit 96 detects the type information, that is, the information showing the frame type or the like, from internal CPU 90, and determines the correspondence between the stream data depending on the type information and the address of external memory 920 for storing the stream data. When the type information detected by data type detection unit 96 shows an I-frame, execution control unit 97 instructs encrypting unit 98 to encrypt the data. In response, encrypting unit 98 encrypts the stream data being transferred from internal memory 94 to external memory 920 by means of memory control unit 95. The encrypted stream data is stored in a storage region in external memory 920 indicated by the address data. On the other hand, when the type information detected by data type detection unit 96 shows other frame than I-frame, execution control unit 97 instructs encrypting unit 98 not to encrypt. In this case, the stream data stored in internal memory 94 is directly transferred to external memory 920 by passing through encrypting unit 98.

When the stream data transferred to external memory 920 is further transferred to internal memory 94, as required, the data is decrypted by decrypting unit 99. That is, when reading in the stream data from external memory 920, data type detection unit 96 detects the type information showing the type of each corresponding frame, based on the address data being read in by memory control unit 95. When the type information detected by data type detection unit 96 shows an I-frame, execution control unit 97 instructs decrypting unit 99 to decrypt the data, and decrypting unit 99 decrypts the stream data being read in. On the other hand, when the type information shows other frame than I-frame, execution control unit 97 instructs decrypting unit 99 so as not execute decrypting process, and the stream data being read in is directly transferred to internal memory 94 by passing through decrypting unit 99.

The stream data thus transferred to internal memory 94 is decoded by decoder 92, and the contents data of video and audio are restored. The restored contents data are delivered from output unit 93.

The conventional data processing device shown in FIG. 7 encrypts and decrypts the data transferred between external memory 920 and LSI 900, partially depending on the detection output of data type detection unit 96. Accordingly, in the conventional data processing device, the encrypting and decrypting load, that is, the data processing quantity can be curtailed as compared with the method of encrypting and decrypting all of transfer data. Also, in the conventional data processing device, in the stream data by the MPEG system, unless the image data corresponding to I-frame is decoded, image data corresponding to other frame cannot be decoded, and the confidentiality of image data is assured. That is, out of the stream data transferred between internal memory 94 of LSI 900 and external memory 920, only the stream data corresponding to I-frame is encrypted, and the confidentiality of image data in the data processing device using external memory 920 can be assured.

However, in the conventional data processing device, in data transfer between LSI 900 and external memory 920, encrypting unit 98 and decrypting unit 99 are needed, and the hardware quantity is increased. Further, in the conventional data processing device, although encrypting and decrypting processes are partial, the required processing load and transfer time are increased. In addition, to detect whether the stream data to be transferred to external memory 920 is I-frame or not, data type detection unit 96 and execution control unit 97 for changing over control of encrypting unit 98 and decrypting unit 99 are additionally needed. As a result, the hardware quantity is further increased, and the process for such control is complicated. In particular, as compressing and encoding techniques, since different standards are proposed such as MPEG-2, MPEG-4, or H.264, to handle stream data conforming to different standards, the process for detecting the data type is further complicated.

As described herein, by processing the copyrighted contents data by using only the internal memory provided in the LSI, illegal data reading can be prevented without using data type detection unit 96 used in the conventional data processing device. However, the required capacity of the internal memory is increased in order to process the image data of huge capacity only by the internal memory.

DISCLOSURE OF THE INVENTION

The data processing device of the present invention is a data processing device having a data processing unit for processing stream data composed of a plurality of frames generated with encoded contents data, which includes a protected storage unit for storing data, being protected from external access, a non-protected storage unit for storing data, a receiving unit for receiving stream data, a separating unit for separating the stream data into protected data including frames necessary for decoding of other frames, and non-protected data not including frames necessary for decoding of other frames, storing the protected data in the protected storage unit and storing the non-protected data in the non-protected storage unit, and a combining unit for restoring the stream data by combining the protected data stored in the protected storage unit and the non-protected data stored in the non-protected storage unit.

According to such data processing device, only the protected data and the non-protected data are stored separately, and the contents cannot be restored by the non-protected data stored in the non-protected storage unit alone, and the protected data stored in the protected storage unit cannot be accessed easily. Hence, this data processing device can assure the confidentiality of contents and protect the copyright in a simple construction without increasing the quantity of the hardware.

In the data processing device of the present invention, the receiving unit receives index information for special reproduction of stream data, together with the stream data, and the separating unit separates into protected data and non-protected data, based on information about entry frame of the index information.

According to such data processing device, since protected data and non-protected data can be separated by utilizing the information about the entry frame included in the index information preliminarily recorded in a recording medium or the like, any means for detecting the type information of frames from the stream data is not needed. Besides, the index information not depending on the compressing and encoding standard can be utilized. Hence, increase of hardware quantity and processing load can be suppressed, and the copyright of contents can be protected.

In the data processing device of the present invention, the separating unit separates into the data including a packet storing data of at least entry frame as protected data, and the data other than the protected data as non-protected data based on the information about entry frame.

According to such data processing device, an important packet necessary for decoding other frames and other packets can be separated easily based on the information about the entry frame. Hence, increase of hardware quantity and processing load can be suppressed, and the confidentiality of contents can be enhanced.

In the data processing device of the present invention, the entry frame is an I-frame of stream data including encoded image data, and the information about the entry frame is information including the information about a packet number and the number of packets storing the encoded image data of the I-frame.

According to such data processing device, a packet storing important I-frame data necessary for decoding other frames and other packets can be separated easily based on the information about the entry frame. Hence, increase of hardware quantity and processing load can be suppressed, and the confidentiality of contents can be enhanced.

In the data processing device of the present invention, the protected storage unit is an internal memory provided inside of a packaged integrated circuit.

According to such data processing device, the protected storage unit is disposed inside of an integrated circuit which can be hardly accessed from outside, and the confidentiality of contents can be further enhanced.

In the data processing device of the present invention, the non-protected storage unit is an external memory provided outside of the integrated circuit.

According to such data processing device, non-protected data incapable of restoring the contents by this data alone is stored in an external memory, and the confidentiality of contents can be assured without increasing the memory capacity in the integrated circuit.

The data processing device of the present invention further includes a memory for storing data, in which the memory is divided into a protected area protected from external access and a non-protected area accessible from outside, and the protected storage unit is the protected area of the memory and the non-protected storage unit is the non-protected area of the memory.

According to such data processing device, the contents cannot be restored only by the non-protected data stored in the non-protected area, and the protected data stored in the protected area cannot be accessed easily, and hence the confidentiality of contents can be assured, and the copyright can be protected.

In the data processing device of the present invention, the data processing unit is divided into a protected processing unit hardly accessible from outside and a non-protected processing unit accessible from outside, the non-protected storage unit is disposed in the non-protected processing unit, and the protected storage unit, the receiving unit, the separating unit, and the combining unit are disposed in the protected processing unit.

According to such data processing device, together with the protected storage unit, the receiving unit, separating unit and combining unit are disposed in the protected processing unit hardly accessible from outside, and the data bus for transferring protected data is also disposed in the protected processing unit, so that the confidentiality of contents can be further enhanced.

In the data processing device of the present invention, the stream data is encrypted stream data, the protected processing unit includes a decrypting unit for decrypting the encrypted stream data and restoring the decrypted stream data, the separating unit separates the decrypted stream data into protected data and non-protected data, and the protected data is stored in the protected storage unit and the non-protected data is stored in the non-protected storage unit, and the combining unit restores the decrypted stream data by combining the protected data stored in the protected storage unit and the non-protected data stored in the non-protected storage unit.

According to such data processing device, since the stream data is encrypted stream data, the stream data cannot be easily interpreted, and the confidentiality of contents is assured. Further, the protected data of decrypted stream data is processed in the protected processing unit, the confidentiality of contents can be further enhanced.

In the data processing device of the present invention, the protected processing unit further includes a decoder for decoding the decrypted stream data restored in the combining unit and restoring the contents data.

According to such data processing device, the protected data of decrypted stream data is processed in the protected processing unit, and the protected data and non-protected data are combined to regenerate decrypted stream data, which is not sent outside of the protected processing unit, so that the confidentiality of contents can be further enhanced.

In the data processing device of the present invention, the protected processing unit is a packaged integrated circuit, and the non-protected storage unit is an external memory provided outside of the integrated circuit.

According to such data processing device, since the protected storage unit, receiving unit, separating unit, and combining unit are disposed inside of the integrated circuit hardly accessible from outside, the data bus for transferring protected data and others are also disposed in the protected processing unit, and the confidentiality of contents can be further enhanced.

In the data processing device of the present invention, the receiving unit receives the stream data and the index information being read from a recording medium for recording the stream data and the index information as a same file.

According to such data processing device, since protected data and non-protected data can be separated by using the index information preliminarily recorded in the recording medium, not depending on the compressing and encoding standards, the copyright of contents can be protected easily while suppressing increase of hardware quantity and processing load.

In the data processing device of the present invention, the receiving unit receives the stream data and the index information being read from a recording medium for recording the stream data and the index information as different files.

According to such data processing device, since protected data and non-protected data can be separated by using the index information preliminarily recorded in the recording medium, not depending on the compressing and encoding standards, the copyright of contents can be protected easily while suppressing increase of hardware quantity and processing load.

In the data processing device of the present invention, the recording medium is an SD memory card, and the index information is data recorded in a medium object information file.

According to such data processing device, since protected data and non-protected data can be separated by using the index information preliminarily recorded in the Secure Digital (SD) memory card, that is, recording medium, not depending on the compressing and encoding standards, the copyright of contents can be protected easily while suppressing increase of hardware quantity and processing load.

The integrated circuit of the present invention includes a receiving unit for receiving stream data, a protected storage unit for storing data, a separating unit for separating the stream data into protected data including frames necessary for decoding of other frames, and non-protected data not including frames necessary for decoding of other frames, and storing the protected data in the protected storage unit and sending out the non-protected data to outside, and a combining unit for restoring the stream data by combining the protected data stored in the protected storage unit and the non-protected data taken from outside.

According to such integrated circuit, the protected storage unit, receiving unit, separating unit and combining unit are disposed in the integrated circuit hardly accessible from outside, and, together with the protected storage unit for storing the protected data, the data bus for transferring the protected data is also disposed in the integrated circuit, and hence the confidentiality of contents can be assured, and the copyright can be protected.

The data processing program of the present invention is a data processing program of a data processing device having a data processing unit for processing stream data composed of a plurality of frames generated with encoded contents data, a protected storage unit for storing data, being protected from external access, and a non-protected storage unit for storing data, the data processing program includes a step of receiving the stream data, a step of separating the stream data into protected data including frames necessary for decoding of other frames, and non-protected data not including frames necessary for decoding of other frames, and storing the protected data in the protected storage unit and storing the non-protected data in the non-protected storage unit, and a step of restoring the stream data by combining the protected data stored in the protected storage unit and the non-protected data stored in the non-protected storage unit.

According to such data processing program, processing in the data processing device can be executed securely, that is, the contents cannot be restored by the non-protected data stored in the non-protected storage unit alone, and the protected data stored in the protected storage unit cannot be accessed easily.

The recording medium of the present invention records the data processing program.

According to the recording medium of data processing program, the data processing program capable of executing the process in the data processing device can be presented, that is, the contents cannot be restored by the non-protected data stored in the non-protected storage unit alone, and the protected data stored in the protected storage unit cannot be accessed easily.

The data processing method of the present invention is a data processing method of a data processing device having a data processing unit for processing stream data composed of a plurality of frames generated with encoded contents data, a protected storage unit for storing data, being protected from external access, and a non-protected storage unit for storing data, the data processing method includes receiving stream data, separating the stream data into protected data including frames necessary for decoding of other frames, and non-protected data not including frames necessary for decoding of other frames, and storing the protected data in the protected storage unit and storing the non-protected data in the non-protected storage unit, and restoring the stream data by combining the protected data stored in the protected storage unit and the non-protected data stored in the non-protected storage unit.

According to such data processing method, processing in the data processing device can be executed securely, that is, the contents cannot be restored by the non-protected data stored in the non-protected storage unit alone, and the protected data stored in the protected storage unit cannot be accessed easily.

DESCRIPTION OF THE REFERENCE NUMERALS AND SIGNS

Figure 1:
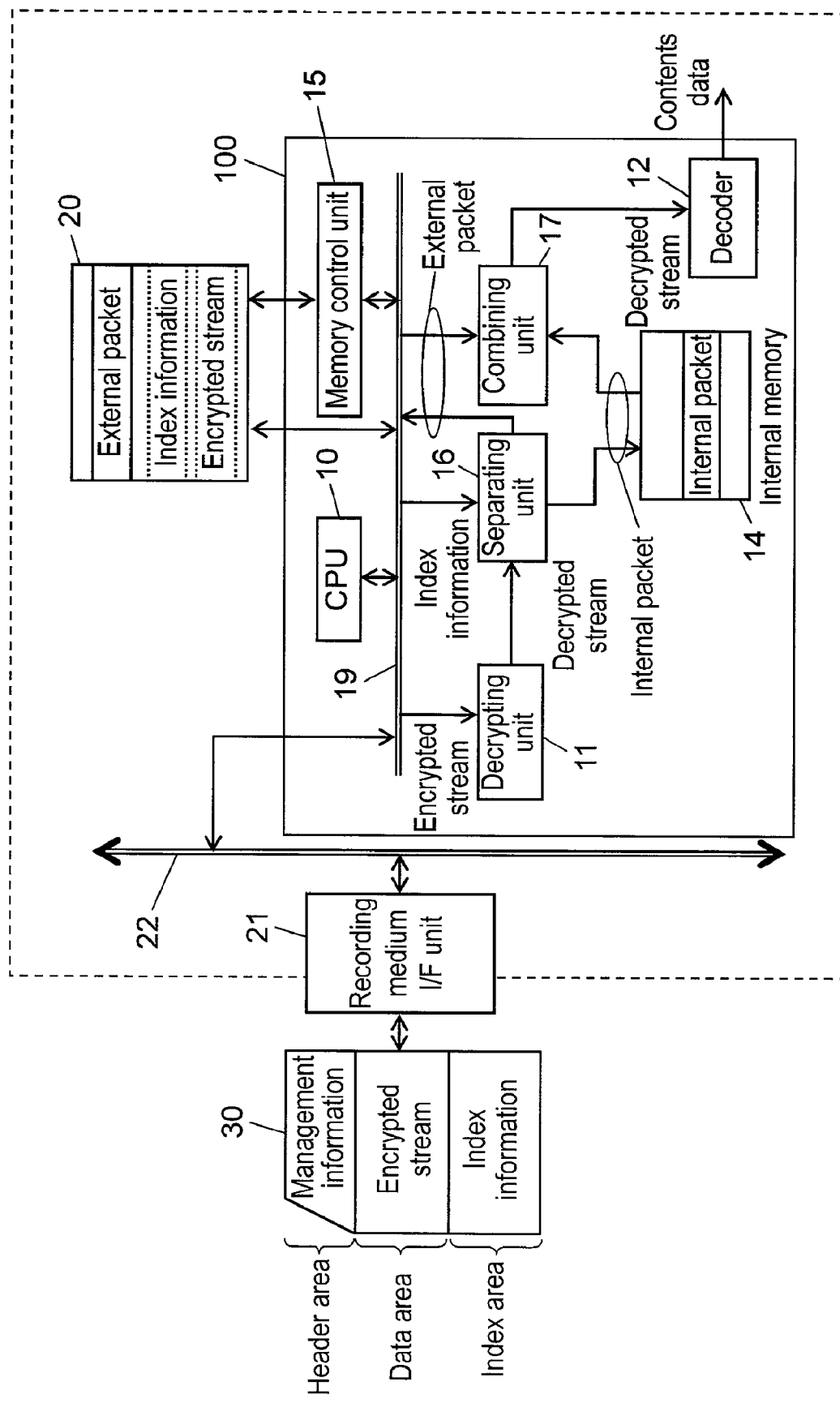
FIG. 1 is a block diagram of a data processing device in a preferred embodiment of the present invention.

10 CPU
11, 99 Decrypting unit
12, 92 Decoder
14, 94 Internal memory
15, 95 Memory control unit
16 Separating unit
17 Combining unit
19 Internal common bus
20, 920 External memory
21, 910 Recording medium interface (I/F) unit
22 Common bus
30 Recording medium
90 Internal CPU
91 Descrambling unit
93 Output unit
96 Data type detection unit
97 Execution control unit
98 Encrypting unit
100, 900 LSI

DETAILED DESCRIPTION OF THE PREFERRED EMBODIMENTS

The data processing device in preferred embodiments of the present invention is described below while referring to the accompanying drawings.

Preferred Embodiment

FIG. 1 is a block diagram of a data processing device in a preferred embodiment of the present invention. As shown in FIG. 1, the data processing device in the preferred embodiment reads in the data recorded in recording medium 30 such as DVD or memory card, and LSI 100 executes data processing while saving the data in process temporarily in external memory 20. In the preferred embodiment, the data processing unit is presented as an example in which LSI 100 decodes or processes the data while using external memory 20, and the restored contents data is delivered from LSI 100. In the preferred embodiment, LSI 100 is packaged or formed as a module, and functions as protected processing unit hardly accessible from outside, and including external memory 20, the outside of LSI 100 functions as non-protected processing unit accessible from outside.

The preferred embodiment shows an example in which recording medium 30 of the data processing device is a portable recording medium, and by loading into the data processing device, the contents recorded in recording medium 30 can be reproduced. In FIG. 1, recording medium 30 is SD memory card or similar memory card. Recording medium 30 records encrypted stream data, that is, encoded, packetized, and encrypted data from contents data. That is, the contents data composed of video and audio signals is encoded by MPEG system or other compressing and encoding system, and the encoded data is packetized in every specific data quantity and transformed into stream data. In the preferred embodiment, in order to protect the contents data recorded in the recording medium 30, the stream data is converted into encrypted stream data (or called encrypted stream). In recording medium 30, encrypted stream generated in this process is recorded as stream data to be processed in the data processing unit.

As shown in FIG. 1, in recording medium 30, such encrypted stream is recorded in a data area, and management information for managing recording medium 30 is recorded in a header area. When recording an encrypted stream, further, designation information for designating specified data in the encrypted stream is generated. As such designation information, for example, information for special reproduction of contents is generated, and the generated information is recorded in an index area as index information. In the preferred embodiment, as the designation information, such index information is used. The index information is the information for special reproduction, such as fast feed reproduction, slow reproduction, scene search, or scene jump. The index information also includes, for example, information for dividing the contents into several sections, and designating the packet number of beginning data of each section. More specifically, it includes the information showing the packet number storing the encoded data of I-frame in MPEG system. Herein, the I-frame is one image data unit formed by compressing and encoding the data in the image of one frame, and it is a frame solely capable of restoring the image in the frame. The stream encoded by MPEG system includes, aside from the I-frame, P-frame and B-frame not capable of restoring the image without help of other frame (reference frame). The detail of each frame is described below. By using such index information, for example, one frame including the beginning data can be reproduced by fast feed reproduction of image by executing sequentially in every beginning frame. That is, fast feed reproduction is realized by restoring and displaying the image of I-frame corresponding to each index information.

This data processing device has such recording medium 30 loaded in recording medium I/F (interface) unit 21 shown in FIG. 1, and reproduces the contents recorded in a status of encrypted stream in recording medium 30.

As shown in FIG. 1, the data processing device includes recording medium I/F unit 21 for reading in data from recording medium 30, LSI 100 as an integrated circuit for processing the data being read in recording medium I/F unit 21, and external memory 20 as non-protected storage unit for storing the data in data processing in LSI 100. Common bus 22 is a common bus for data transfer or data communication between units in the device, and data is transferred between recording medium I/F unit 21 and LSI 100 by way of common bus 22. In the preferred embodiment, recording medium I/F unit 21 functions as a receiving unit for receiving stream data.

External memory 20 is, inside this data processing device, a semiconductor memory not having protective function of large capacity, for example, provided outside of LSI 100. External memory 20 is provided for temporarily saving non-protected data not causing inconvenience if read out from outside, in particular, in each process executed by LSI 100. In the preferred embodiment, external memory 20 is explained as a non-protected memory accessible from outside, but an easily protected memory may be also used.

LSI 100 includes, as shown in FIG. 1, decrypting unit 11, internal memory 14, separating unit 16, combining unit 17, and decoder 12. Decrypting unit 11 decrypts the encrypted stream recorded in recording medium 30, and restores the decrypted stream data (or called decrypted stream) as encoded and packetized contents data. Internal memory 14 is a protected storage unit protected from external access, and stores the data in data processing in LSI 100. Separating unit 16 uses the index information recorded in recording medium 30, and separates the decrypted stream into an internal packet as protected packet of protected data, and into an external packet as non-protected packet of non-protected data. Further, separating unit 16 controls to record the separated internal packet into internal memory 14, and to record the separated external packet into external memory 20. Combining unit 17 combines the internal packet recorded in internal memory 14 and the external packet recorded in external memory 20 conforming to the packet numbers, and restores a decrypted stream. Decoder 12 decodes the decrypted stream restored in combining unit 17, and restores contents data.

LSI 100 includes CPU 10 as a processor for controlling each process of LSI 100 or executing part of process, and memory control unit 15 for controlling data writing or reading with external memory 20. LSI 100 also includes internal common bus 19 as a common bus, and data is transferred between units as shown in FIG. 1 in LSI 100 by way of internal common bus 19.

In LSI 100 thus composed, according to the instruction from CPU 10, each data of recording medium 30 loaded in recording medium I/F unit 21 is transferred from recording medium I/F unit 21 to LSI 100 by way of common bus 22.

Decrypting unit 11 decrypts the encrypted stream of recording medium 30 thus transferred. Decrypting unit 11 produces the data generated by decryption as decrypted stream. The generated decrypted stream is the stream data composed of a plurality of packets which are packetized the encoded data that encoded the contents data by compressing and encoding system such as MPEG system. That is, decrypting unit 11 executes decryption, and restores stream data as decrypted stream. Such decrypted stream is supplied into separating unit 16. Instead of supplying encrypted stream directly into decrypting unit 11 from recording medium I/F unit 21, once, part or whole of encrypted stream may be saved in external memory 20, and the saved encrypted stream may be read out and processed. In FIG. 1, encrypted stream is once saved in external memory 20.

In separating unit 16, in addition to decrypted stream from decrypting unit 11, index information recorded in recording medium 30 is supplied. The index information is read from recording medium 30 by control of CPU 10 when, for example, loading recording medium 30 in recording medium I/F unit 21, or when selecting the contents to be reproduced. Further, the index information being read in is temporarily saved in external memory 20 or internal memory 14 by CPU 10. In FIG. 1, the index information being read in is temporarily saved in external memory 20. As mentioned above, the index information is information for special reproduction, and includes, for example, information of contents divided into several sections and indicating the packet numbers including the beginning data of each section. Separating unit 16 uses such index information, and judges each packet of decrypted stream supplied from decrypting unit 11 whether it is packet specified by index information or not. According to the judging result, separating unit 16 classifies the packet specified by index information as internal packet, and other packets as external packets. Separating unit 16 transfers the classified internal packet to internal memory 14, and the classified external packet to external memory 20. By processing in this manner, separating unit 16 separates the decrypted stream as stream data into an internal packet as protected data including frames necessary for decoding of other frames, and an external packet as non-protected data not including frames necessary for decoding of other frames. Further, separating unit 16 stores the internal packet in internal memory 14 as protected storage unit, and stores the external packet in external memory 20 as non-protected storage unit.

Internal memory 14 is, for example, a semiconductor memory provided inside of LSI 100, and is provided for temporarily saving the data of each process to be executed by LSI 100. In particular, the present invention is intended to protect the copyright of contents, and therefore, preferably, internal memory 14 provided inside of LSI 100 as protected processing unit should be protected from outside of LSI 100 so as not to be accessible easily. Hence, in the preferred embodiment, such internal memory 14 is not connected, for example, to internal common bus 19 accessible from outside, but is connected only to separating unit 16 and combining unit 17 protected from outside and hardly accessible. That is, internal memory 14 stores the internal packet transferred from separating unit 16, and the stored internal packet is read out by control from combining unit 17. Internal memory 14 may also save other data than internal packet, but from the viewpoint of protection of contents, it is desired to construct so as not to be accessible easily from outside.

Memory control unit 15 is a control unit for transferring between internal common bus 19 and external memory 20, for example, by DMA (direct memory access). Memory control unit 15 controls to send out the address, write signal and read signal to external memory 20, to write each data in specified regions, and to read out from specified regions. That is, the external packet separated by separating unit 16 is first supplied into internal common bus 19. Further, by control from memory control unit 15, the external packet supplied in internal common bus 19 is saved in a specified region in external memory 20. Also by control from memory control unit 15, each data including external packets saved in external memory 20 is read out into internal common bus 19.

In combining unit 17, the internal packet saved in internal memory 14 and the external packet saved in external memory 20 are supplied. Combining unit 17 judges the packet numbers of the supplied internal packet and external packet, and delivers the internal packet or external packet according to the sequence of the judged packet numbers. Thus, combining unit 17 produces same decrypted stream as the decrypted stream restored in decrypting unit 11. Combining unit 17 sends the generated decrypted stream to decoder 12.

Decoder 12 decodes the supplied decrypted stream. That is, decoder 12 decodes the encoded data contained in each packet of decrypted stream, and restores the contents data corresponding to video and audio signals.

The data processing device of the preferred embodiment of the present invention, having such configuration, restores the contents data from the encrypted stream recorded in recording medium 30.

The operation of the data processing device having such configuration is described below.

Figure 2:
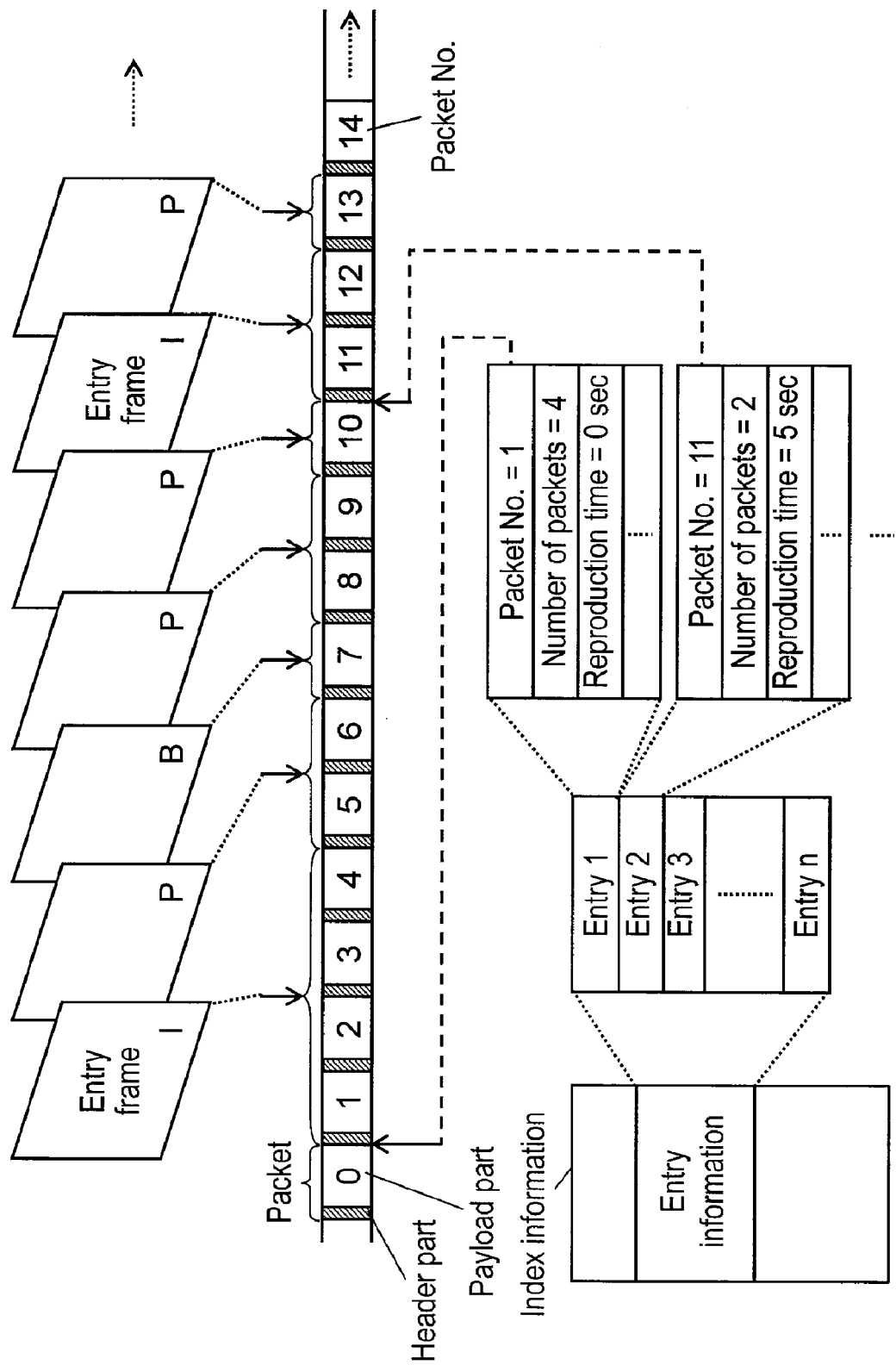
FIG. 2 is a diagram showing a configuration of decrypted stream and configuration of index information.
Figure 3:
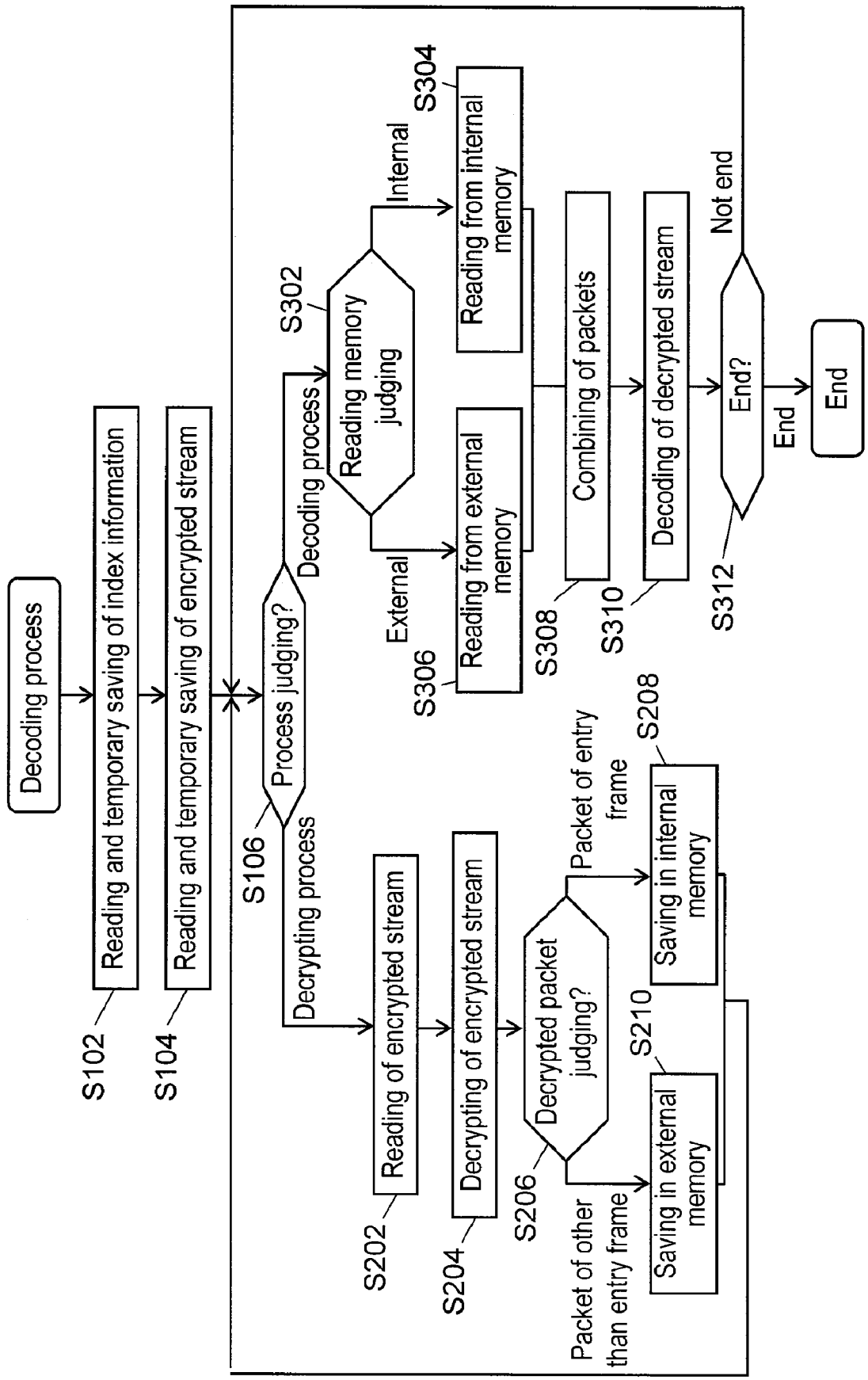
FIG. 3 is a flowchart of procedure of decoding process of a data processing device in a preferred embodiment of the present invention.
Figure 4:
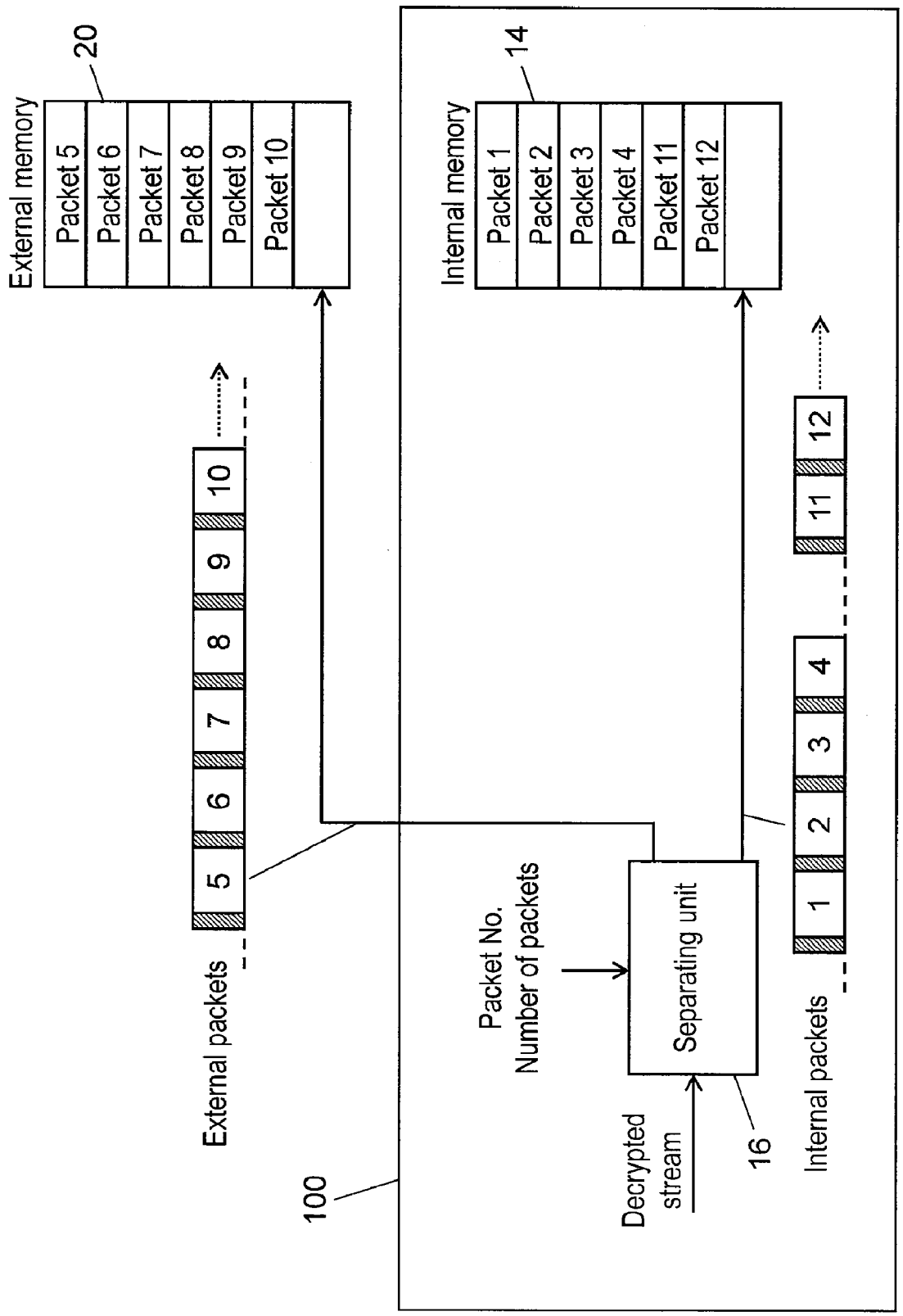
FIG. 4 is a diagram showing an operation example of separating decrypted stream by a separating unit.

FIG. 2 is a diagram showing a configuration of decrypted stream generated by decrypting unit 11 and configuration of index information recorded in recording medium 30. FIG. 3 is a flowchart of procedure of decoding process of a data processing device in the preferred embodiment of the present invention. The data processing method of the present invention is realized by executing the procedure shown in FIG. 3. FIG. 4 is a diagram showing an operation example of separating decrypted stream by separating unit 16, by using the index information composed as shown in FIG. 2, in the decrypted stream shown in FIG. 2. By referring to these diagrams, the operation of this data processing device is explained below.

First referring to FIG. 2, the encrypted stream and index information recorded in recording medium 30 are described. As mentioned above, contents data is recorded in recording medium 30 as encrypted stream of encoded, packetized and encrypted data. That is, in the process of converting the contents data into encrypted stream, first, image data contained in contents is converted into encoded data of each frame. The basic algorithm of image compressing and encoding system widely used at the present such as MPEG system is a compressing and encoding system combining motion compensation system with discrete cosine transform (DCT) system. In such compressing and encoding system, image is compressed and encoded by combining both DCT encoded data in one frame of image, that is, in-screen encoded data, and DCT encoded data predicting between motion compensation between screens, that is, inter-screen prediction encoded data. Generally, the in-screen encoded frame is called I-frame, inter-screen forward prediction encoded frame is called P-frame, and inter-screen two-direction prediction encoded frame is called B-frame. For example, a plurality of screens divided in the unit of I-frame are combined, and an image unit called GOP (group of pictures) in MPEG-2 system is composed. Further, the I-frame is composed of encoded data encoded within a screen, the image of the frame can be restored only by the encoded data corresponding to I-frame. On the other hand, to restore the P-frame and B-frame generated by inter-screen prediction, the image data of reference frame is needed, and the image cannot be restored only by these encoded data alone.

FIG. 2 shows a mode of packetizing encoded data in I-frame, P-frame and B-frame. That is, as shown in FIG. 2, each packet is composed of a header part storing header information, and a payload part storing data, and the encoded data is stored in the payload part. In FIG. 2, the encoded data is stored as follows. First, the encoded data of I-frame is stored in each payload part of packets in packet numbers 1, 2, 3 and 4. The encoded data of P-frame is stored in each payload part of packets in packet numbers 5 and 6. The encoded data of B-frame is stored in payload part of packet in packet number 7, and sequentially, encoded data of each frame is stored similarly. Thus, stream data is composed of plurality of frames. By the plurality of packets storing such encoded data, stream data encoded and packetized contents data is composed. Recording medium 30 records encrypted stream further encrypted such stream data. By decrypting the encrypted stream by decrypting unit 11 of LSI 100, the decrypted stream of such stream data is restored.

Further, in recording medium 30, index information is recorded as information for special reproduction. FIG. 2 shows an example of entry information included in the index information. The entry information is the information of contents divided into several sections for designating packet numbers including the beginning data of each section. In FIG. 2, in the entry frame, each I-frame is the beginning of a section, and the encoded data of such entry frame is stored in the packet, and its information is shown as an example of entry information. That is, as shown in FIG. 2, in the entry information divided by each entry, each entry stores information such as the packet number of a beginning packet storing the encoded data of I-frame as entry frame, the number of packets of such packets, and the reproduction time which is the time for reproducing. For example, in FIG. 2, entry 1 stores "1" as the beginning packet number of packets of packet numbers 1, 2, 3 and 4 storing the encoded data of I-frame, and "4" as the number of these packets. Entry 2 stores "11" as the beginning packet number of packets of packet numbers 11 and 12 storing the encoded data of next I-frame, and "2" as the number of these packets. By utilizing such entry information, for example, by reproducing the only packets instructed by each entry, special reproduction such as fast-forward mode is realized. In particular, since the I-frame can restore the image of the frame by its encoded data alone, special reproduction can be realized easily.

FIG. 3 shows the procedure of decoding about the operation of restoring the contents data by this data processing device, by taking in such data from recording medium 30 in which the encrypted stream and index information are recorded as explained in FIG. 2. In FIG. 3, for example, from recording medium 30, index information and encrypted stream are once stored into external memory 20, and the stored data are transferred to LSI 100. Further, in order to decode according to the data processing method of encrypted stream as shown in FIG. 3, CPU 10 sequentially reads the data processing programs stored in the program memory such as recording medium recording programs, and executes the process as follows according to the data processing programs being read.

First, recording medium 30 is loaded into this data processing device, and when the user instructs reproduction of contents, for example, CPU 10 receives such instruction information via control unit or the like for controlling the entire data processing device. According to such instruction information, CPU 10 starts the control for executing the decoding process as shown in FIG. 3.

First of all, CPU 10 instructs recording medium I/F unit 21 to read in the encrypted stream and index information according to an instruction from recording medium 30. Consequently, the index information and the encrypted stream are transferred from recording medium 30 to LSI 100 by way of recording medium I/F unit 21. CPU 10 further instructs memory control unit 15 to save these transferred data into external memory 20. As a result, the index information is read from recording medium 30, and the index information is temporarily saved in a specified region in external memory 20 (step S102). From recording medium 30, the encrypted stream is read in, and the encrypted stream is temporarily saved in a specified region in external memory 20 (step S104).

Later, in LSI 100, decoding process is executed while external memory 20 is being used. CPU 10 judges the process status in LSI 100, and judges that the encrypted stream to be decrypted is saved in external memory 20 so that it is ready to start the decrypting process by decrypting unit 11, and then starts the control for executing the decrypting process. CPU 10 judges that the decrypted stream to be decoded is saved in external memory 20 and internal memory 14 so that it is ready to execute the decoding process by combining unit 17 and decoder 12, and starts the control for executing the decoding process (step S106).

When CPU 10 judges that the decrypting process can be executed, CPU 10 instructs memory control unit 15 to read the encrypted stream saved in external memory 20, and memory control unit 15 controls to transfers the encrypted stream from external memory 20 to LSI 100 (step S202). At the same time, CPU 10 instructs memory control unit 15 to read in also the index information corresponding to the encrypted stream to be transferred, and takes in such index information. The encrypted stream transferred from external memory 20 to LSI 100 is further supplied into decrypting unit 11 by way of internal common bus 19.

Consequently, decrypting unit 11 executes a decrypting process for interpreting the encryption of the supplied encrypted stream, and produces the decrypted data, and sends out as decrypted stream (step S204). Decrypting unit 11 supplied such decrypted stream to separating unit 16.

Separating unit 16 receives, in addition to the decrypted stream from decrypting unit 11, also the index information corresponding to the decrypted stream supplied from CPU 10. That is, when the decrypted stream as shown in FIG. 2 is supplied, for example, information of entry 1 corresponding to packets of packet numbers 1, 2, 3 and 4 storing the encoded data of I-frame, or information of entry 2 corresponding to packets of packet numbers 11 and 12 is supplied from CPU 10 to separating unit 16. Separating unit 16 detects the packet number of each packet of the sequentially supplied decrypted streams, and judges if the detected packet number is the packet specified by the entry information or not. According to this judgment, separating unit 16 classifies the packet specified by the entry information, that is, the packet storing the encoded data of entry frame as internal packet, and packets storing encoded data other than entry frames as external packet (step S206). Further, separating unit 16 transfers the classified internal packets to internal memory 14, and transfers the classified external packets to external memory 20.

The data of the internal packets transferred from separating unit 16 to internal memory 14 is saved in a specified region in internal memory 14 (step S208). The data of the external packets transferred from separating unit 16 to external memory 20 is transferred by way of internal common bus 19, and is saved in a specified region in external memory 20 by the control of memory control unit 15 (step S210).

CPU 10 judges the process status in LSI 100, and further judges that more encrypted stream to be decrypted are saved in external memory 20, thereby judging to execute further the process from step S202 to step S208 or step S210, then the process from step S202 to step S208 or step S210 is further repeated. As a result, the packets of decrypted streams are classified into internal packets and external packets according to the entry information, and saved separately in internal memory 14 and external memory 20.

When CPU 10 judges that the decoding process can be executed, it starts the control for executing the decoding process. First, combining unit 17 receives the internal packets saved in internal memory 14 and the external packets saved in external memory 20. Combining unit 17 detects the packet numbers of the supplied internal packets and external packets, and judges the individual packet numbers (step S302). Combining unit 17 judges the packet numbers, and first reads in the packet number at the beginning from internal memory 14 or external memory 20 (step S304 and step S306). Further, combining unit 17, reading in the packets, sends out the internal packet or external packet according to the sequence of packet numbers. Thus, the packets separately saved in internal memory 14 and external memory 20 are combined (step S308), and the decrypted stream is restored. The decrypted stream is supplied into decoder 12, and is decoded by decoder 12 (step S310). That is, the encoded data contained in the packets of the decrypted stream is decoded by decoder 12, and contents data corresponding to video and audio signals are issued from decoder 12. CPU 10 judges the process status in LSI 100, and judges that the decrypted stream to be decoded is saved in external memory 20 and internal memory 14, thereby judging to continue further the decoding process, and then back to step S106, such decrypting process and decoding process are continued, and when judging to terminate such decoding process, the decoding process is terminated (step S312).

CPU 10, in addition to execution of such process according to the data processing program, may be also designed to execute part or all of the process of decrypting unit 11, the process of separating unit 16, the process of combining unit 17, the decoding process of restoring encoded data, and the process of control of external memory.

FIG. 4 is a diagram showing an example of operation of separation of decrypted streams by separating unit 16.

Referring next to FIG. 4, the operation for executing the process from step S202 to step S208 or step S210 in FIG. 3 is specifically described below. FIG. 4 shows an example of supplying of decrypted streams shown in FIG. 2 into separating unit 16. In this case, the entry information such as entry 1 or entry 2 shown in FIG. 2 is noticed from CPU 10 to separating unit 16.

In FIG. 4, the decrypted stream as shown in FIG. 2 is supplied in separating unit 16, and the entry information as shown in FIG. 2 is noticed from CPU 10. As a result, separating unit 16 judges the internal packet based on packet number of packet number 1 and the number of packets of number of packets 4 of entry 1. That is, separating unit 16 detects the packet numbers of packets supplied sequentially, and compares the detected packet number and packet number 1 specified by entry 1, and when it judges the detected packet number is packet number 1 designated by entry 1, it transfers the packet of this packet number 1 to internal memory 14 as internal packet. Further, separating unit 16 transfers three packets succeeding the packet of packet number 1 to internal memory 14 as internal packets, based on the number of packets 4 specified by entry 1. Thus, separating unit 16 judges the packets storing the encoded data of entry frame by the packet number and number of packets of entry information, and the packets storing the encoded data of entry frame are saved in internal memory 14 as internal packets. That is, as shown in FIG. 4, packets of packet numbers 1, 2, 3 and 4 of four packets from packet number 1 specified by entry 1 are saved in internal memory 14 as internal packets.

CPU 10 informs separating unit 16 of the packet number of packet number 11 of entry 2 and the number of packets of number of packets of 2. Separating unit 16 detects the packet number of the packet to be supplied next, and compares the detected packet number with packet number 11 designated by entry 2. Next to the packets of packet numbers 1, 2, 3 and 4, a packet of packet number 5 is supplied. Hence, separating unit 16 judges that the detected packet number 5 and the packet number 11 designated by entry 2 are different numbers, knowing it is the encoded data other than of entry frame, and transfers the packet of packet number 5 to external memory 20 as external packet. Similarly, separating unit 16 judges that encoded data other than of entry frame is stored in the packets of packet numbers 6, 7, 8, 9 and 10 of the decrypted stream shown in FIG. 2, and transfers these packets to external memory 20 as external packets.

Separating unit 16, same as in the case of entry 1, judges that the packets of packet numbers 11 and 12 of the decrypted stream shown in FIG. 2 are packets corresponding to the entry frame, by making use of packet number 11 and the number of packets of 2 of entry 2, and transfers to internal memory 14 as internal packets.

When separating unit 16 executes such operation, as shown in FIG. 4, the internal packet storing the encoded data of I-frame capable of restoring the image is saved in internal memory 14 inside of LSI 100 hardly accessible from outside. Moreover, external packets storing encoded data of P-frame or B-frame not capable of restoring the image by the encoded data alone are saved in accessible external memory 20.

In this manner, in the data processing device of the preferred embodiment, and the data processing method of encrypted stream according to the procedure shown in FIG. 3, inside LSI 100 as protected processing unit, the index information for special reproduction preliminarily recorded in recording medium 30 is utilized, and each packet of the decrypted stream is distributed and recorded separately in internal memory 14 as protected storage unit and external memory 20 as non-protected storage unit. Accordingly, in the data processing device and the data processing method of the present invention, inside of LSI 100, it is not required to dispose encrypting unit or decrypting unit in relation to external memory 20, or not required to dispose data type detecting unit or execution control unit for detecting the type information of frame from decrypted stream. Further, the data processing device and the data processing method of the present invention designed to record packets including important data such as entry frame selectively in internal memory 14, and record packets including other data in external memory 20. Therefore, according to the data processing device and the data processing method of the present invention, the contents cannot be restored from the data recorded in external memory 20, and the packet including important data is recorded in safe internal memory 14 protected from external access, so that the confidentiality of image data can be assured.

A next example is a specific description of index information used for classifying the packets of decrypted stream into internal memory and external memory. In this example, SD memory card is used as recording medium 30.

Figure 5:
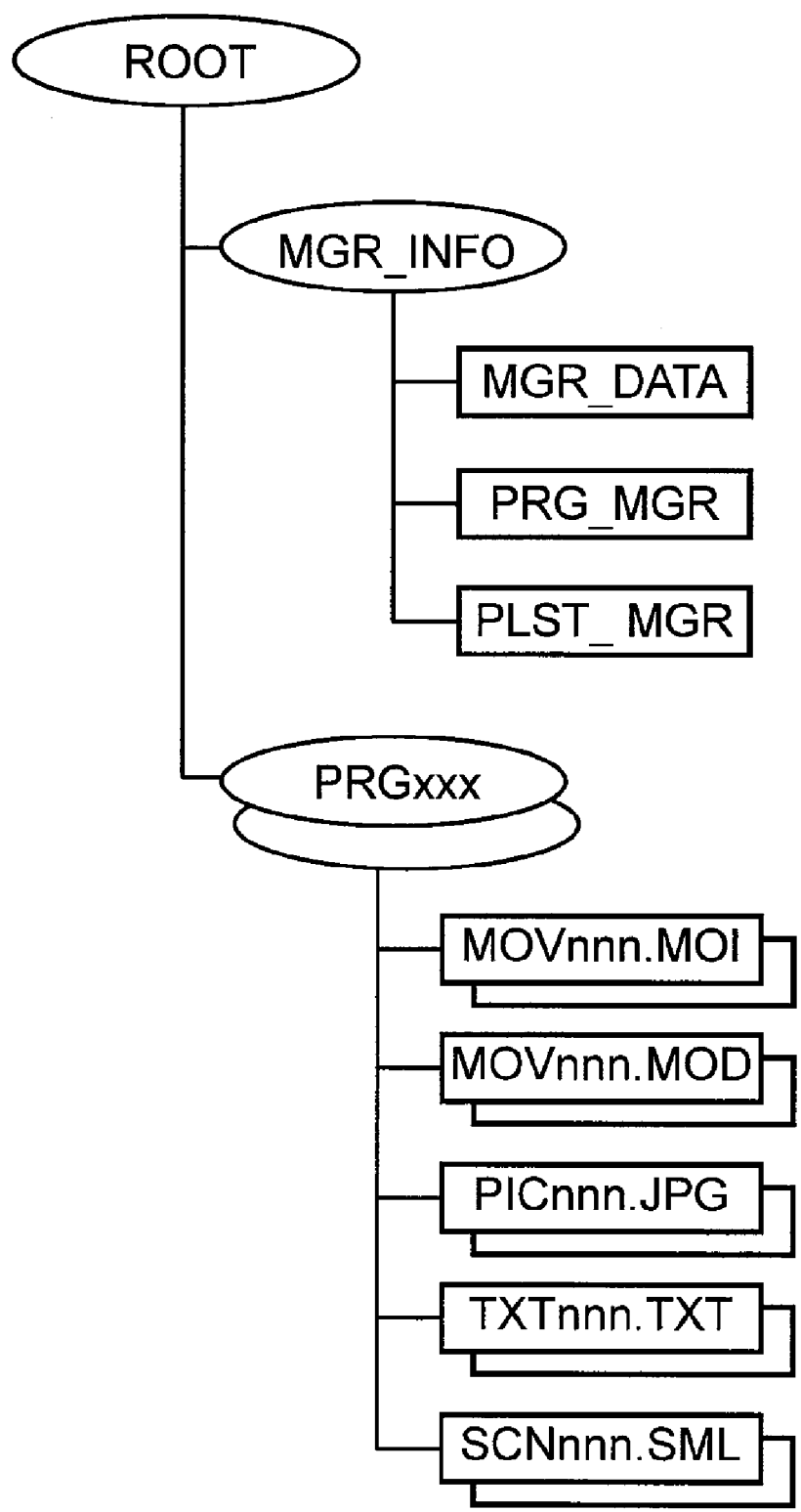
FIG. 5 is a directory configuration diagram of contents and management information file composed in an SD memory card.

FIG. 5 is a block diagram of a directory of contents and management information file composed in the SD memory card as recording medium 30. The data including contents such as encrypted stream handled in the present invention is recorded as medium object data file (MOVnnn.MOD, where nnn is a hexadecimal number showing a medium object data file number) in contents directory (PRGxxx) in program unit. The information about individual medium object data is recorded in medium object information file (MOVnnn.MOI). The index information in the present invention is also included in such medium object information. Further, if there are still picture data (PICnnn.JPG) and text data (TXTnnn.TXT) to be reproduced simultaneously with the medium object data, they are recorded respectively in PICnnn.JPG and TXTnnn.TXT files. When reproducing a plurality of moving picture data simultaneously, the scene description data file (SCNnnn.SML) describes which medium object data files should be reproduced simultaneously. The management information of the entire program is recorded in management data file (MGR_DATA), program manager file (PRG_MGR), and play list management file (PLST_MGR) in the management directory (MGR_INFO).

The medium object information file (MOVnnn.MOI) stores index information for special reproduction, for example, "DataType", "DataSize", "PlayBackDuration", "TxtAttr", "TstType", "TstInterval", "FrameTime", "NumTstEntry1" or "NumTstEntry2", "NumModui", "MODU_ INFO" (specifically ModuiTbl [size is NumModui]), "ModuNumber", "EntryFrameDiff", "ModuOffset", "PacketSize", and "NumFrame".

Among such information, "DataType" shows the type of medium object information file. "DataSize" shows the size of data of medium object information file. "PlayBackDuration" shown the playback duration of medium object. "TxtAttr" show the attribute such as character code used in text data. "TstType" shows the type of time search table, and it is used when changed in the structure of time search table, or the meaning of the value of constituent element, depending on the file format of the medium object data file. The time search table is a table storing information for specifying the time search entry as the marker for the ease of search. "TstInterval" show the resolution of time search table time. "FrameTime" shows the time of one frame expressed by a fraction. "NumTstEntry1" or "NumTstEntry2" shows the number of entries of time search table. "NumModui" shows the number of information tables of medium object data unit (or called "MODU") as the compressing and encoding unit always possible to reproduce from this position. "MODU_INFO" (specifically ModuiTbl [size is NumModui]) shows the information table of MODU. "ModuNumber" shows the MODU number corresponding to each entry point. "EntryFrameDiff" shows the number of frames from the preceding entry frame to time search entry. "ModuOffset" shows the position (bytes) of the corresponding MODU. "PacketSize" shows the size of one packet. "NumFrame" shows the number of frames in one packet.

The information table of MODU ("MODU_INFO") includes other information such as "EntrySize", "ModuPbTime", and "ModuSize".

More specifically, "EntrySize" shows the size of entry frame. "ModuPbTime" shows the number of frames for composing MODU. "ModuSize" shows the size of MODU.

Figure 6:
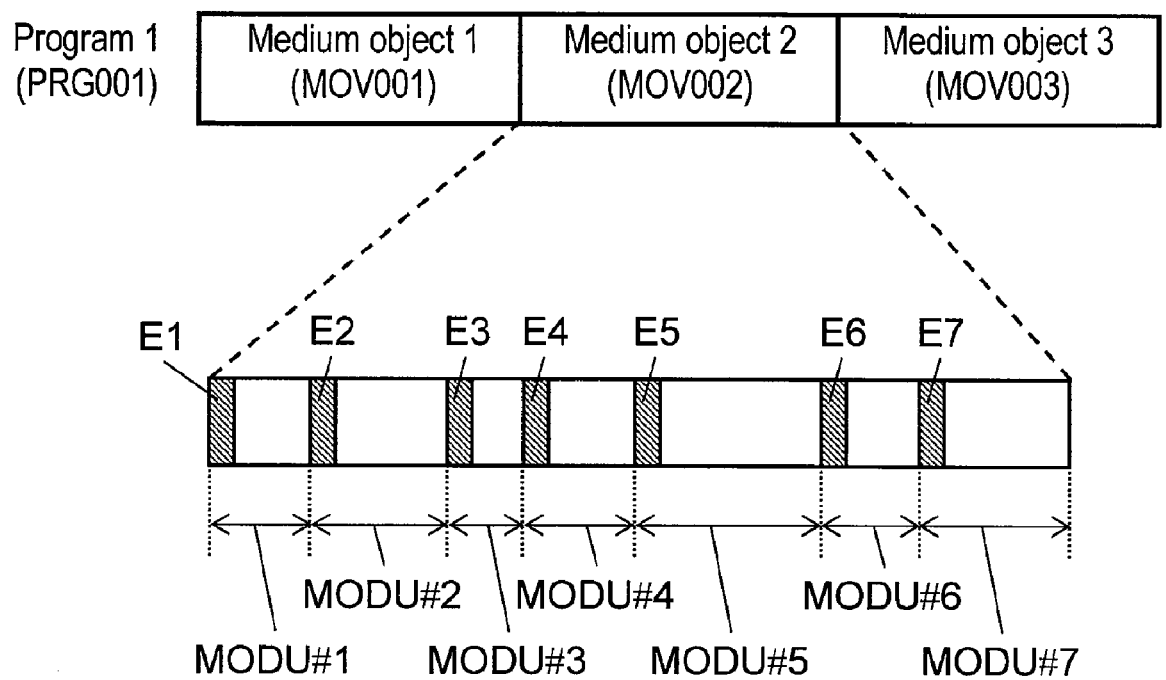
FIG. 6 is a diagram showing a configuration of medium object data file of the SD memory card.
Figure 7:
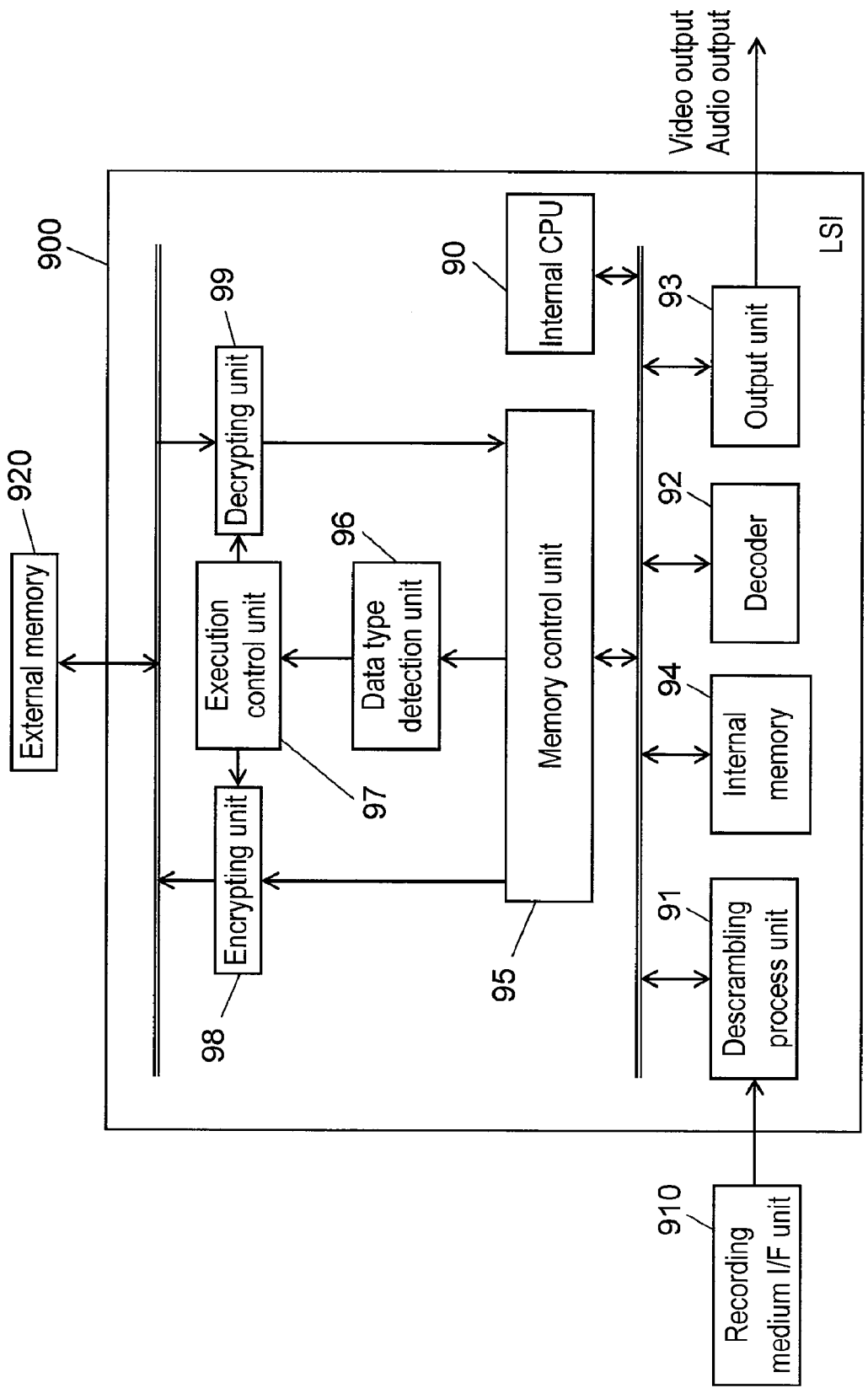
FIG. 7 is a block diagram of a conventional data processing device.

FIG. 6 is a diagram of configuration of medium object data file such as encrypted stream to be recorded in SD memory card as recording medium 30. In the SD memory card as recording medium 30, stream data is recorded in a program unit such as filming of a school athletic meet or recording of a movie. Also as shown in FIG. 6, each program includes one or a plurality of medium objects. That is, a filming program of a school athletic meet (PRG001) records various medium objects, such as medium object of opening ceremony of the athletic meet (MOV001), medium object of 100-meter run (MOV002), and medium object of closing ceremony of the athletic meet (MOV003). Each medium object includes a plurality of medium object data units MODU. Each MODU is a unit of image similar to GOP in MPEG-2 system, and usually starts from I-frame as mentioned above. That is, the I-frame as shown in FIG. 2 is an entry frame, and the data from the beginning of I-frame to immediately before start of next I-frame is compiled as one medium object data unit MODU. FIG. 6 shows an example of medium object (MOV002) composed from MODU#1 to MODU#7, each starting from the entry frame indicated by E1 to E7.

When contents data is recorded in an SD memory card of directory or file configuration shown in FIG. 5 and FIG. 6, the recording device inspects all program numbers in the root directory, determines program numbers yyy to be created newly, and makes a contents directory (PRGyyy). When the recording device detects an instruction of start of recording, the entered contents data is converted into an encrypted stream, and recorded in PRGyyy as a medium object data MOV 001.MOD file. Further, the recording device compiles a medium object information file MOV001.MOI including information about entry frame of each medium object data unit MODU. Consequently, when the recording device detects an instruction of stop of recording, recording of MOV001.MOD file is completed, and each related information is recorded in the medium object information file MOV001.MOI. The values of MODU information MODU_INFO, entry number "NumTstEntry", and entry information ("ModuNumber", "EntryFrameDiff", "ModuOffset", etc.) are determined while the recorded MOV001.MOD file is being inspected. Thereafter, every time recording is instructed, the recording device repeats the same process while updating the medium object data file number. Thus, in the SD memory card as recording medium 30, the contents data is recoded in a form of encrypted stream as medium object data file MOVnnn.MOD as shown in FIG. 6. At the same time, the related information of medium object including information about entry frame is recorded in the medium object information file MOVnnn.MOI.

In reproduction of the SD memory card in which the contents are recorded in such recording format, for example, in the case of fast-forward reproduction, by referring to the information about entry recorded in the medium object information file MOVnnn.MOI, entry frames Em recorded in the medium object data file MOVnnn.MOD as shown in FIG. 6 are read out sequentially, so that fast-forward reproduction is operated. That is, by referring to the medium object information file MOVnnn.MOI, from the MODU position "ModuOffset" corresponding to #m-th MODU, the data is read out by the number of bytes corresponding to the entry frame size "EntrySize" recorded in MODU information table "ModuiTbl" for composing the MODU information "MODU_INFO". At the end of reading, moving to the beginning of entry frame of next MODU, similarly, the medium object data MOVnnn.MOD is read out by the portion of entry frame size. By further moving to a next MODU, the reproduction is repeated, and fast-forward reproduction is realized.

In this data processing device, when restoring the contents data from recording medium 30, that is, the SD memory card in which the contents are recorded in the recording format as specified above, LSI 100 processes for restoring the contents data from the encrypted stream recorded in the medium object data file MOVnnn.MOD, by making use of the information about the entries recorded in the medium object information file MOVnnn.MOI. Based on the operation of the data processing device explained so far, separating unit 16 of LSI 100 stores the data of packets corresponding to the entry frame in internal memory 14, and stores other data in external memory 20, by making use of the information about entries, such as each MODU position "ModuOffset" and entry frame size "EntrySize" recorded in the medium object information file MOVnnn.MOI. This data processing device operates in this manner, and executes the decoding process of contents data.

Thus, as known from the specific example of restoring the contents data from the encrypted stream recorded in the SD memory card, according to the data processing device and the data processing method of the present invention, by making use of the entry information included in the index information for special reproduction or the like already recorded in the medium object information file MOVnnn.MOI, the packets including important data such as entry frame are recorded selectively in internal memory 14, and packets including other data are recorded in external memory 20.

Therefore, according to the data processing device and the data processing method of the present invention, in the protected storage area protected from external access such as internal memory 14, protected data necessary for decoding of other frames such as I-frame is stored, and other non-protected data is stored in the non-protected storage area accessible from outside such as external memory 20. Hence, by the non-protected data stored in the non-protected storage area only, the image data cannot be restored, and the protected data stored in the protected storage area is not accessible easily, so that the confidentiality of the image data can be assured.

Also according to the data processing device and the data processing method of the present invention, the protected data and the non-protected data can be separated by making use of the entry frame information or the like included in the index information for special reproduction preliminarily recorded in the recording medium. As a result, in the integrated circuit, means for detecting the type information of frame is not needed, and the packets including important data such as entry frame can be selectively recorded in the internal memory in the protected processing unit in the integrated circuit protected from external access. Thus, by the data processing device and the data processing method of the present invention, the protected data and the non-protected data can be separated by utilizing the supplied index information, and not depending on the compression and encoding standard or the like, the data processing device and the data processing method suppressed in increase of hardware quantity or processing load and capable of protecting the copyright of the contents can be presented.

In the above example of the preferred embodiment, the contents recorded in a recording medium such as DVD, SD memory card or other portable recording medium are reproduced by the data processing device, but the recording medium for reproduction is not particularly specified, and, for example, a hard disk drive (HDD) or other recording medium built in the device may be also used. Other examples include the recording medium and recording device connected by way of the Internet or other network or USB cable or IEEE1394. This data processing device may be also composed as a data processing device for reproducing the contents of contents data of encrypted stream including index information supplied as Internet distribution or broadcast.

This data processing device may be further composed as a data processing device for recording contents data of encrypted stream including index information supplied as Internet distribution or broadcast, once in a portable recording medium or a recording medium or recording device installed in the device or distributed through the network, and reproducing the recorded contents data.

As explained in the preferred embodiment, an external memory is provided as semiconductor memory provided outside of the LSI, but the external memory may be also realized by HDD installed in the device. Or, without installing such external memory in the data processing device, a separated external packet may be recorded in the recording medium or recording device connected by way of the Internet, other network, or USB cable or IEEE1394. Moreover, a separated external packet may be recorded in a vacant region in a portable recording medium recording the encrypted stream to be reproduced, or a recording medium or recording device installed in the device or by way of the network.

In the preferred embodiment, the protected processing unit as means protected from external access is explained by presenting an example of LSI or an integrated circuit internally integrating functions of decrypting unit, internal memory, separating unit, combining unit and decoder, but these functions may be realized by a plurality of integrated circuits, and formed into a package or module for protecting from external access. In short, the structure is not particularly specified as far as it is possible to prohibit access to the decrypted stream restored by the decrypting unit or to the internal packet.

In the preferred embodiment, further, in the integrated circuit as protected processing unit, functions of decrypting unit, internal memory, separating unit, combining unit and decoder are disposed, but the data processing device may not have such protected processing unit. In this case, the data processing device is provided with protected storage unit protected from external access, and non-protected storage unit accessible from outside like external memory, as mere storing means. The separating unit separates the stream data into protected data including frames necessary for decoding of other frames, and non-protected data not including frames necessary for decoding of other frames. Further, the protected data is stored in the protected storage unit and the non-protected data is stored in the non-protected storage unit. In order to separate in this manner by the separating unit, as mentioned above, it is proposed to use the entry frame information of index information. The present invention may be composed in this manner, and in such a simple structure, the image data cannot be restored only by the non-protected data stored in the non-protected storage unit, and the confidentiality of image data can be assured. In this case, the protected processing unit and the non-protected processing unit may be realized by separate recording means, or one recording means may be realized by separating into a portion protected from external access and a portion accessible from outside.

In the preferred embodiment, as shown in FIG. 5, the stream or data including encrypted stream or contents is recorded as medium object data file MOVnnn.MOD, and the medium object information including index information is recorded as medium object information file MOVnnn.MOI, so as to be recorded in recording media as different files, but the stream or data including contents and the index information may recorded in the recording medium as same file.

The preferred embodiment is an example of a structure of recording internal packets important from the viewpoint of protection of contents in the internal memory provided in the LSI protected from illegal access, but, for example, in the external memory, a protected region not accessible illegally from outside so as not to be mapped in the logical address or user space, and a non-protected region accessible from outside are provided, and the packet including the packet storing the data of entry frame separated by control of separating unit is recorded in protected region in external memory as protected packet, and other separated packets may be recorded in the non-protected region of external memory as non-protected packets.

The present invention is described by referring to the preferred embodiment, but the present invention is not limited to the illustrated preferred embodiment alone, but may include the following other examples.

(1) The data processing device and the data processing method are not limited to the above configuration of receiving encrypted stream from recording medium, but may designed to receive the decrypted stream. The partner is not limited to the recording medium, but may include any device capable of exchanging contents such as portable telephone.

(2) The data processing device and the data processing method are not limited to the above configuration in which the separating unit separates in frame units, but may be formed in a structure not separating in frame units. For example, a part of I-frame (such as only central part) may be recorded in protected storage unit or protected region. As a result, the protected region can be saved in area. In other example not separating in frame units, by judging whether the packet includes DCT coefficient or the packet does not include DCT coefficient, the packet including the DCT coefficient may be classified as protected data, and others may be separated as non-protected data.

(3) The data processing device and the data processing method are not limited to the above configuration in which stream data is temporarily recorded in protected storage unit or non-protected storage unit, but the data may be stored for a long period. In such case, the protected storage unit and non-protected storage unit are not volatile memories, but may be realized by non-volatile memories or HDD capable of recording data for a long period.

(4) In the preferred embodiment, the P- and B-frames are not provided with identification information, but in the data processing device and the data processing method, the P- and B-frames may be provided with identification information. In this case, however, the identification information of the I-frame must be provided with information identifying the I-frame.

(5) The data processing device and the data processing method are not limited to the above configuration in which the separating unit separates in packet units, but it may separate in other units. The dividing units are not specified so far as the contents cannot be decoded by the data stored in the non-protected storage unit.

(6) Each device mentioned herein is a computer system specifically composed of microprocessor, ROM, RAM, hard disk unit, display unit, keyboard, and mouse. Computer programs are stored in the RAM or hard disk unit. The microprocessor operates according to the computer program, and each device achieves its function. Herein, the computer program is composed by combining a plurality of command codes showing instructions to the computer for achieving the specified function.

(7) Part or whole of constituent elements for composing each device may be composed of one system LSI (large scale integration). The system LSI is a super-function LSI manufactured by integrating a plurality of components on one chip, and it is specifically a computer system composed of microprocessor, ROM, RAM, and others. Computer programs are stored in the RAM. The microprocessor operates according to the computer programs, and the system LSI achieves its functions.

The constituent elements of each device may be individually formed into chips, or part or whole may be included in one chip.

The system LSI is shown in this example, but it may be also called IC, LSI, super LSI, or ultra LSI depending on the degree of integration. The technique of circuit integration is not limited to LSI, but it may be realized also by exclusive circuit or general-purpose processor. It is also possible to employ FPGA (field programmable gate array) which can be programmed after manufacture of LSI, or reconfigurable processor which can be changed in connection or setting of circuit cells in the LSI.

Further, new technologies of circuit integration replacing the LSI by progress and application of semiconductor technology may be employed, and the functional blocks may be integrated, or biotechnologies may be also applied.

(8) Part or whole of constituent elements for composing each device may be composed of an IC card or a single module that can be attached to each device. The IC card or the module is a computer system composed of microprocessor, ROM, and RAM. The IC card or the module may include the super-multifunctional LSI. The microprocessor operates according to the computer program, and the IC card or the module achieves its function. The IC card or the module may be preferably provide with tamper resistance.

(9) The present invention is the methods shown above. It may be also realized by a computer program capable of realizing these methods by a computer, or may be realized by digital signals composed of the computer program.

In the present invention, the computer program or the digital signals are recorded in a computer-readable recording medium, such as flexible disk, hard disk, CD-ROM, MO, DVD, DVD-ROM, DVD-RAM, BD (Blu-ray Disc), or semiconductor memory. It may be also realized the digital signals recorded in these recording media.

The present invention is also intended to transmit the computer program or the digital signals by way of electric communication circuits, wireless or wired communication circuits, the Internet, other networks or data broadcast.

The present invention provides a computer system comprising a microprocessor and a memory, and the memory stores the computer program, and the microprocessor operates according to the computer program.

It may be executed by other independent computer system by recording and transferring the program or the digital signals into the recording media, or transferring the program or the digital signals by way of the network.

(10) The preferred embodiment and the other examples may be properly combined.

INDUSTRIAL APPLICABILITY

The present invention is capable of reproducing the contents while protecting the contents from the recording media in which important copyrighted contents data are recorded. Accordingly, the present invention may be applied, for example, in a data processing device for decoding contents data from an encrypted stream recorded in a recording medium such as DVD or memory card, a reproducing device for reproducing the contents from the recording medium having such decoding function, and a recording and reproducing device having a function of recording the contents in the recording medium, and further a broadcast receiving device, communication device, information device and others having functions for reproducing the contents from the recording media in which image, sound and other contents are recorded.

The invention claimed is:

1. A data processing device having a data processing unit for processing stream data composed of a plurality of frames generated with encoded contents data, comprising:
    a protected storage unit for storing data, being tamper-resistant and protected from external access;
    a non-protected storage unit for storing data, being accessible from outside and different from the protected storage unit;
    a receiving unit for receiving encrypted stream data generated by encrypting the stream data, and index information for special reproduction of the stream data;
    a decrypting unit for decrypting the encrypted stream data and outputting the decrypted stream data;
    a separating unit for judging, for each packet of the decrypted stream data output by the decrypting unit, whether the packet is a packet specified by the index information or not, separating the decrypted stream data into the packet specified by index information as protected data including frames necessary for special reproduction, and other packets not specified by index information as non-protected data not including frames necessary for special reproduction, storing the protected data in the protected storage unit, and storing the non-protected data in the non-protected storage unit; and
    a combining unit for restoring the stream data when the data processing unit performs normal reproduction of the stream data, by receiving the protected data stored in the protected storage unit and the non-protected data stored in the non-protected storage unit, by judging packet numbers of packets of the received protected data and packets of the received non-protected data specified by the index information, and delivering the packets according to the sequence of the judged packet numbers.

2. The data processing device of claim 1,
    wherein the index information comprises information about entry frame, and
    the separating unit separates the stream data into protected data and non-protected data, based on the information about the entry frame included in the index information.

3. The data processing device of claim 2,
    wherein the separating unit separates into the data including a packet storing data of at least entry frame as protected data, and the data other than the protected data as non-protected data based on the information about the entry frame.

4. The data processing device of claim 3,
    wherein the entry frame is an I-frame of stream data including encoded image data, and the information about the entry frame is information including the information about a packet number and the number of packets storing the encoded image data of the I-frame.

5. The data processing device of claim 3,
    wherein the data processing unit is divided into a protected processing unit being protected from external access and a non-protected processing unit accessible from outside,
    the non-protected storage unit is disposed in the non-protected processing unit, and
    the protected storage unit, the receiving unit, the separating unit, and the combining unit are disposed in the protected processing unit.

6. The data processing device of claim 5,
    wherein the protected processing unit further includes a decoder for decoding the decrypted stream data restored in the combining unit and restoring the contents data.

7. The data processing device of claim 2,
wherein the protected storage unit is an internal memory provided inside of a packaged integrated circuit.

8. The data processing device of claim 7,
wherein the non-protected storage unit is an external memory provided outside of the integrated circuit.

9. The data processing device of claim 2,
wherein the data processing unit is divided into a protected processing unit being protected from external access and a non-protected processing unit accessible from outside,
the non-protected storage unit is disposed in the non-protected processing unit, and
the protected storage unit, the receiving unit, the separating unit, and the combining unit are disposed in the protected processing unit.

10. The data processing device of claim 2,
wherein the receiving unit receives the encrypted stream data and the index information being read from a recording medium for recording the encrypted stream data and the index information as a same file.

11. The data processing device of claim 2,
wherein the receiving unit receives the encrypted stream data and the index information being read from a recording medium for recording the encrypted stream data and the index information as different files.

12. The data processing device of claim 11,
wherein the recording medium is an Secure Digital (SD) memory card, and the index information is data recorded in a medium object information file.

13. The data processing device of claim 1,
wherein the protected storage unit is an internal memory provided inside of a packaged integrated circuit.

14. The data processing device of claim 1, further comprising:
a memory for storing data,
wherein the memory is divided into a protected area protected from external access and a non-protected area accessible from outside, and
the protected storage unit is the protected area of the memory and the non-protected storage unit is the non-protected area of the memory.

15. The data processing device of claim 1,
wherein the data processing unit is divided into a protected processing unit being protected from external access and a non-protected processing unit accessible from outside,
the non-protected storage unit is disposed in the non-protected processing unit, and
the protected storage unit, the receiving unit, the separating unit, and the combining unit are disposed in the protected processing unit.

16. The data processing device of claim 15,
wherein the protected processing unit is a packaged integrated circuit, and the non-protected storage unit is an external memory provided outside of the integrated circuit.

17. The data processing device of claim 1 further including a memory control unit, wherein the protected storage unit is only enabled to receive and transfer protected data from and to the respective separating unit and the combining unit, wherein when the data processing unit instructs the memory control unit to read in the index information and based on such index information enables the separating unit to separate packets of decrypted stream data for storage in respectively the protected storage unit and the non-protected storage unit and when the data processing unit enables a decoding process the combining unit based on such index information can combine the stored protected and non-protected stream data packets independent of compressing and encoding standards.

18. An integrated circuit comprising:
a receiving unit for receiving encrypted stream data generated by encrypting the stream data, and index information for special reproduction of the stream data;
a protected storage unit for storing data, being tamper-resistant and protected from external access;
a decrypting unit for decrypting the encrypted stream data and outputting the decrypted stream data;
a separating unit for judging, for each packet of the decrypted stream data output by the decrypting unit, whether the packet is a packet specified by the index information or not, separating the decrypted stream data into the packet specified by index information as protected data including frames necessary for special reproduction, and other packets not specified by index information as non-protected data not including frames necessary for special reproduction, and storing the protected data in the protected storage unit and sending out the non-protected data to outside; and
a combining unit for restoring the stream data when the data processing unit performs normal reproduction of the stream data, by receiving the protected data stored in the protected storage unit by judging packet numbers of packets of the received protected data and packets of the received non-protected data specified by the index information and delivering the packets according to the sequence of the judged packet numbers.

19. A non-transitory computer-readable recording medium on which a data processing program of a data processing device is recorded, the data processing device having:
a data processing unit for processing stream data composed of a plurality of frames generated with encoded contents data;
a protected storage unit for storing data, being tamper-resistant and protected from external access; and
a non-protected storage unit for storing data, being accessible from outside and different from the protected storage unit,
the data processing program comprising:
receiving encrypted stream data generated by encrypting the stream data, and index information for special reproduction of the stream data;
decrypting the encrypted stream data and outputting the decrypted stream data;
separating, based on the index information, each packet of the decrypted stream data into protected data including frames necessary for special reproduction, and other packets not specified by index information as non-protected data not including frames necessary for special reproduction, and storing the protected data in the protected storage unit and storing the non-protected data in the non-protected storage unit; and
restoring the stream data when the data processing unit performs normal reproduction of the stream data, by receiving the protected data stored in the protected storage unit and the non-protected data stored in the non-protected storage unit by judging packet numbers of packets of the received protected data and packets of the received non-protected data specified by the index information, and delivering the packets according to the sequence of the judged packet numbers.

20. A data processing method of a data processing device, the data processing device having:

a data processing unit for processing stream data composed of a plurality of frames generated with encoded contents data;

a protected storage unit for storing data, being tamper-resistant and protected from external access; and a non-protected storage unit for storing data, being accessible from the outside and different from the protected storage unit, the data processing method comprising:

receiving encrypted stream data generated by encrypting the stream data and index information for special reproduction of the stream data;

separating, based on the index information, each packet of the decrypted stream data into protected data including frames necessary for special reproduction, and other packets not specified by index information as non-protected data not including frames necessary for special reproduction, and storing the protected data in the protected storage unit and storing the non-protected data in the non-protected storage unit; and restoring the stream data when the data processing unit performs normal reproduction of the stream data, by receiving the protected data stored in the protected storage unit and the non-protected data stored in the non-protected storage unit by judging packet numbers of packets of the received protected data and packets of the received non-protected data specified by the index information, and delivering the packets according to the sequence of the judged packet numbers.

* * * * *